(12) United States Patent
Steinberg et al.

(10) Patent No.: US 7,702,236 B2
(45) Date of Patent: Apr. 20, 2010

(54) DIGITAL IMAGE ACQUISITION DEVICE WITH BUILT IN DUST AND SENSOR MAPPING CAPABILITY

(75) Inventors: Eran Steinberg, San Francisco, CA (US); Adrian Zamfir, Bucharest (RO); Stefan Petrescu, Bucharest (RO)

(73) Assignee: FotoNation Vision Limited, Galway (IE)

( * ) Notice: Subject to any disclaimer, the term of this patent is extended or adjusted under 35 U.S.C. 154(b) by 166 days.

(21) Appl. No.: 11/674,650

(22) Filed: Feb. 13, 2007

(65) Prior Publication Data

US 2007/0189757 A1    Aug. 16, 2007

Related U.S. Application Data

(60) Provisional application No. 60/773,714, filed on Feb. 14, 2006.

(51) Int. Cl.
G03B 7/00 (2006.01)
G03B 43/00 (2006.01)
H04N 17/00 (2006.01)

(52) U.S. Cl. ............................. 396/213; 348/180
(58) Field of Classification Search ............ 396/121, 396/125–128; 348/180, 187, 189, 335
See application file for complete search history.

(56) References Cited

U.S. PATENT DOCUMENTS

| | | |
|---|---|---|
| 3,541,941 A | 11/1970 | Barr et al. |
| 3,621,136 A | 11/1971 | Stanwood |
| 4,186,301 A | 1/1980 | Basire et al. |
| 4,354,204 A | 10/1982 | Kimura |
| 4,748,509 A | 5/1988 | Otake et al. |
| 5,065,257 A | 11/1991 | Yamada |
| 5,093,716 A | 3/1992 | Kondo et al. |
| 5,214,470 A | 5/1993 | Denber |
| 5,216,504 A | 6/1993 | Webb et al. .............. 348/190 |
| 5,315,538 A | 5/1994 | Borrell et al. |
| 5,416,516 A | 5/1995 | Kameyama et al. |
| 5,436,979 A | 7/1995 | Gray et al. |
| 5,475,429 A | 12/1995 | Kodama |
| 5,485,534 A | 1/1996 | Takemoto et al. |
| 5,526,446 A | 6/1996 | Adelson et al. |
| 5,541,655 A | 7/1996 | Kaneda |

(Continued)

FOREIGN PATENT DOCUMENTS

EP    1157544 A1    11/2001

(Continued)

OTHER PUBLICATIONS

U.S. Appl. No. 11/462,035.

(Continued)

*Primary Examiner*—W. B. Perkey
*Assistant Examiner*—Minh Q Phan
(74) *Attorney, Agent, or Firm*—Andrew V. Smith (57) ABSTRACT

A digital image acquisition device has an image acquisition sensor, a shutter, an aperture and optical elements for focusing an image on the sensor. The device includes a light source located in the body of the device. The light source is periodically activated with one of the aperture or shutter closed, and the device derives a map of defects on the surface of the sensor from a calibration image acquired by the sensor when illuminated by the light source.

53 Claims, 4 Drawing Sheets

U.S. PATENT DOCUMENTS

| | | | |
|---|---|---|---|
| 5,557,689 | A | 9/1996 | Huttenlocher et al. |
| 5,576,715 | A | 11/1996 | Litton et al. |
| 5,625,413 | A | 4/1997 | Katoh et al. |
| 5,643,699 | A | 7/1997 | Waldner |
| 5,873,830 | A | 2/1999 | Hossack et al. |
| 5,926,212 | A | 7/1999 | Kondo |
| 5,926,291 | A | 7/1999 | Haraguchi et al. |
| 5,965,896 | A | 10/1999 | Marton |
| 5,969,372 | A | 10/1999 | Stavely et al. |
| 5,974,194 | A | 10/1999 | Hirani et al. |
| 5,982,941 | A | 11/1999 | Loveridge et al. |
| 6,002,436 | A | 12/1999 | Anderson ............... 348/372 |
| 6,018,363 | A | 1/2000 | Horii |
| 6,035,072 | A | 3/2000 | Read |
| 6,035,073 | A | 3/2000 | Kaup |
| 6,061,092 | A | 5/2000 | Bakhle et al. |
| 6,094,511 | A | 7/2000 | Metcalfe et al. |
| 6,097,847 | A | 8/2000 | Inoue |
| 6,125,213 | A | 9/2000 | Morimoto |
| 6,139,202 | A * | 10/2000 | Depatie et al. ............. 396/449 |
| 6,167,206 | A | 12/2000 | Hylen |
| 6,181,378 | B1 | 1/2001 | Horie et al. |
| 6,192,161 | B1 | 2/2001 | Kondo et al. |
| 6,231,185 | B1 | 5/2001 | Pipa |
| 6,233,364 | B1 | 5/2001 | Krainiouk et al. |
| 6,266,054 | B1 | 7/2001 | Lawton et al. |
| 6,323,855 | B1 | 11/2001 | Hamilton, Jr. et al. |
| 6,326,998 | B1 | 12/2001 | Palum |
| 6,329,826 | B1 | 12/2001 | Shinada et al. |
| 6,344,640 | B1 | 2/2002 | Rhoads |
| 6,364,835 | B1 | 4/2002 | Hossack et al. |
| 6,381,357 | B1 | 4/2002 | Tan et al. |
| 6,434,272 | B1 | 8/2002 | Saarelma |
| 6,465,801 | B1 | 10/2002 | Gann et al. |
| 6,487,321 | B1 | 11/2002 | Edgar et al. |
| 6,563,945 | B2 | 5/2003 | Holm |
| 6,567,116 | B1 | 5/2003 | Aman et al. |
| 6,587,592 | B2 | 7/2003 | Georgiev et al. |
| 6,636,646 | B1 | 10/2003 | Gindele |
| 6,690,816 | B2 | 2/2004 | Aylward et al. |
| 6,700,667 | B2 | 3/2004 | Nishi |
| 6,707,950 | B1 | 3/2004 | Burns et al. |
| 6,733,136 | B2 | 5/2004 | Lantz et al. |
| 6,740,883 | B1 | 5/2004 | Stodilka et al. |
| 6,791,608 | B1 | 9/2004 | Miyazawa |
| 6,792,161 | B1 | 9/2004 | Imaizumi et al. |
| 6,829,008 | B1 | 12/2004 | Kondo et al. |
| 6,842,196 | B1 | 1/2005 | Swift et al. |
| 6,874,420 | B2 | 4/2005 | Lewis, Jr. et al. |
| 6,895,109 | B1 | 5/2005 | Schemmel et al. |
| 6,919,892 | B1 | 7/2005 | Cheiky et al. |
| 6,933,978 | B1 | 8/2005 | Suda |
| 6,940,545 | B1 | 9/2005 | Ray et al. |
| 6,940,550 | B2 | 9/2005 | Kitawaki et al. |
| 6,940,554 | B2 | 9/2005 | Robins et al. |
| 6,947,786 | B2 | 9/2005 | Simon et al. |
| 6,983,886 | B2 | 1/2006 | Natsukari et al. |
| 6,995,346 | B2 | 2/2006 | Johanneson et al. |
| 7,003,136 | B1 | 2/2006 | Harville |
| 7,020,350 | B2 | 3/2006 | Sakai et al. |
| 7,026,830 | B2 | 4/2006 | Shinada et al. |
| 7,058,294 | B2 | 6/2006 | Nakahara |
| 7,061,648 | B2 | 6/2006 | Nakajima et al. |
| 7,085,430 | B2 | 8/2006 | Winsor et al. |
| 7,127,126 | B2 | 10/2006 | Sakai et al. |
| 7,149,262 | B1 | 12/2006 | Nayar et al. |
| 7,206,461 | B2 | 4/2007 | Steinberg et al. |
| 7,245,315 | B2 | 7/2007 | Sadok et al. |
| 7,256,818 | B2 | 8/2007 | Sadok et al. |
| 7,280,696 | B2 | 10/2007 | Zakrzewski et al. |
| 7,295,233 | B2 | 11/2007 | Steinberg et al. |
| 7,308,156 | B2 | 12/2007 | Steinberg et al. |
| 7,310,450 | B2 | 12/2007 | Steinberg et al. |
| 7,315,658 | B2 | 1/2008 | Steinberg et al. |
| 7,340,109 | B2 | 3/2008 | Steinberg et al. |
| 7,369,712 | B2 | 5/2008 | Steinberg et al. |
| 7,424,170 | B2 | 9/2008 | Steinberg et al. |
| 2001/0039804 | A1 | 11/2001 | Newman et al. ............... 62/66 |
| 2003/0036860 | A1 | 2/2003 | Rice et al. ................... 702/57 |
| 2003/0039402 | A1 * | 2/2003 | Robins et al. ............... 382/275 |
| 2003/0174902 | A1 | 9/2003 | Barkan ........................ 382/274 |
| 2003/0193604 | A1 | 10/2003 | Robins et al. |
| 2005/0068445 | A1 | 3/2005 | Steinberg et al. |
| 2005/0068446 | A1 | 3/2005 | Steinberg et al. |
| 2005/0068447 | A1 | 3/2005 | Steinberg et al. |
| 2005/0068448 | A1 | 3/2005 | Steinberg et al. |
| 2005/0068449 | A1 | 3/2005 | Steinberg et al. |
| 2005/0068450 | A1 | 3/2005 | Steinberg et al. |
| 2005/0068451 | A1 | 3/2005 | Steinberg et al. |
| 2005/0068452 | A1 * | 3/2005 | Steinberg et al. ............ 348/335 |
| 2005/0078173 | A1 | 4/2005 | Steinberg et al. |
| 2005/0104997 | A1 | 5/2005 | Nonaka |
| 2006/0039690 | A1 | 2/2006 | Steinberg et al. |
| 2006/0098237 | A1 | 5/2006 | Steinberg et al. |
| 2006/0098890 | A1 | 5/2006 | Steinberg et al. |
| 2006/0098891 | A1 | 5/2006 | Steinberg et al. |
| 2007/0116380 | A1 | 5/2007 | Ciuc et al. |
| 2008/0240555 | A1 | 10/2008 | Nanu et al. |

FOREIGN PATENT DOCUMENTS

| | | | |
|---|---|---|---|
| EP | 1188309 A1 | | 3/2002 |
| EP | 1478169 A2 | | 11/2004 |
| EP | 1478169 A3 | | 11/2004 |
| EP | 1507157 A2 | | 2/2005 |
| EP | 1507157 B1 | | 7/2006 |
| JP | 4221748 A2 | | 8/1992 |
| JP | 2000-50062 A2 | | 2/2000 |
| JP | 2004327485 A | * | 11/2004 |
| WO | 03/019473 | | 3/2003 |
| WO | WO-03019483 A1 | | 3/2003 |
| WO | WO 2005/041558 A1 | | 5/2005 |
| WO | WO 2005/109853 A1 | | 5/2005 |
| WO | 2007/095556 A2 | | 8/2007 |
| WO | WO-2007095483 A2 | | 8/2007 |
| WO | 2007/095556 A3 | | 7/2008 |

OTHER PUBLICATIONS

U.S. Appl. No. 11/282,955.

Doignon, C. et al., "A robust camera calibration technique for high resolution image acquisition", Proceedings of the European Conference on Multimedia Applications, Services and Techniques, 1996, pp. 267-278, vol. 1.

Dominguez-Castro, R. et al, "A 0.8-μm CMOS Two-Dimensional Programmable Mixed-Signal Focal-Plane Array Processor with On-Chip Binary Imaging and Instructions Storage http://citeseer.ist.psu.edu/280486.html", IEEE Journal of Solid-State Circuits, 1997, vol. 32-Issue 7.

EPO Invitation Pursuant to Article 96(2) and Rule 51(2) EPC, for Application No. 04765121.1, dated May 7, 2007, 4 Pages.

Final Office Action mailed Jul. 15, 2009, for U.S. Appl. No. 10/676,820, filed Sep. 30, 2003.

Forchheimer, R. et al., "Near-sensor image processing: a new paradigm, http://ieeexplore.ieee.org/xpl/freeabs_all.jsp?arnumber=336244", IEEE Transactions on Image Processing, 1994, pp. 736-746, vol. 3—Issue 6.

Mann, S. et al., "On Being 'Undigital' With Digital Cameras: Extending dynamic Range by Combining Differently Exposed Pictures, http://www.eyetap.org/wearcomp/is.sub.-_t95.sub._myversion.ps.gz.", 7 pages.

Non-Final Office Action mailed Apr. 16, 2007, for U.S. Appl. No. 10/676,845, filed Sep. 30, 2003. cited by other.

Non-Final Office Action mailed Apr. 16, 2007, for U.S. Appl. No. 10/677,134, filed Sep. 30, 2003. cited by other.

Non-Final Office Action mailed Feb. 9, 2007, for U.S. Appl. No. 10/676,716, filed Sep. 30, 2003.
Non-Final Office Action mailed Feb. 9. 2007, for U.S. Appl. No. 10/676,823, filed Sep. 30, 2003.
Non-Final Office Action mailed Jul. 23, 2007, for U.S. Appl. No. 11/673,577, filed Feb. 10, 2007.
Non-Final Office Action mailed Jun. 14, 2007, for U.S. Appl. No. 10/677,139, filed Sep. 30, 2003. cited by other.
Non-Final Office Action mailed Jun. 14, 2007, for U.S. Appl. No. 10/677,140, filed Sep. 30, 2003. cited by other.
Patent Abstracts of Japan, publication No. 2000050062, Image Input Device, application No. 10-217124, published Feb. 18, 2000, 1 page.
PCT International Preliminary Report on Patentability for PCT Application PCT/EP2004/010199, dated Apr. 3, 2006, 7 pages.
PCT Notification of Transmittal of the International Search Report and the Written Opinion of the International Searching Authority, or the Declaration, for PCT/EP2004/010199, paper dated Dec. 13, 2004, 13 pages.
PCT Notification of Transmittal of the International Search Report and the Written Opinion of the International Searching Authority, or the Declaration, for PCT/US2007/061964, paper dated Sep. 16, 2008, 12 pages.
Notification of Transmittal of the International Search Report and the Written Opinion of the International Searching Authority, or the Declaration, for PCT Application No. PCT/US2007/062093, dated Mar. 12, 2008, 9 pages.

* cited by examiner

DIGITAL IMAGE ACQUISITION DEVICE WITH BUILT IN DUST AND SENSOR MAPPING CAPABILITY

PRIORITY

This application claims the benefit of priority under 35 USC §119 to U.S. provisional patent application No. 60/773,714, filed Feb. 14, 2006 and this application is counterpart to PCT Application No. PCT/US2007/062093, filed Feb. 13, 2007.

BACKGROUND

1. Field of the Invention

The present invention relates to a digital image acquisition device, and in particular a camera, such as for example a digital single lens reflex (DSLR) camera, which is configured to mitigate problems that would otherwise be caused by dust particles or other defects in the electronic sensor of the acquisition device.

2. Description of the Related Art

Figure 1:
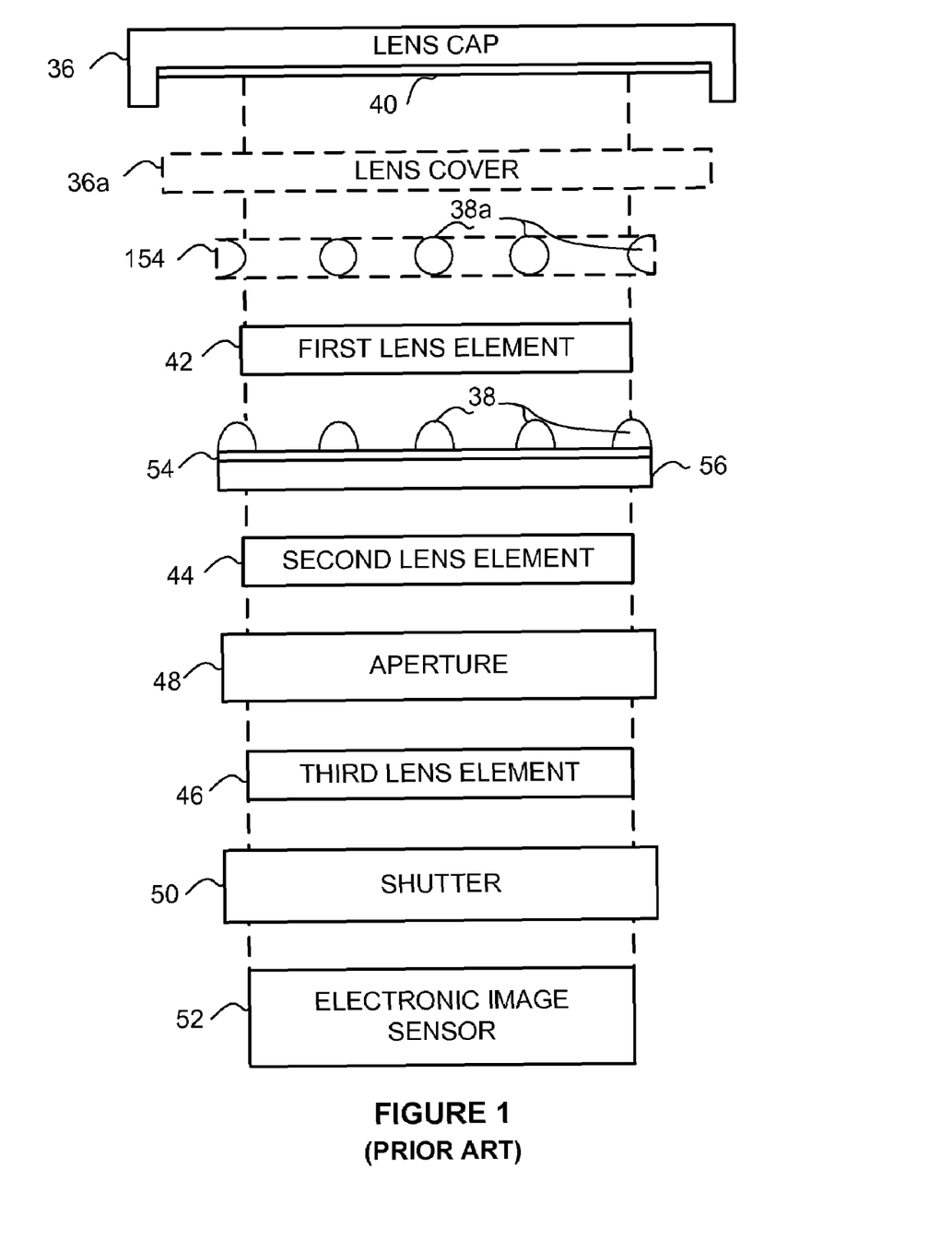
FIG. 1 shows the camera system as disclosed in US published application no. 2003/0193604.

A map of defects caused by dust particles present in optical elements of a digital image acquisition device may be generated, and used in processing images captured by the device. For example, FIG. 1 of US published patent application no. 2003/0193604 to Robins, which is hereby incorporated by reference, illustrates a set of LEDs 38 or 38a disposed within camera lens elements 42, 44, 46 and, with the lens cover 36, 36a in place, lighting the LEDs and acquiring a calibration image from the camera sensor to detect contamination of the camera lens elements.

In addition, published PCT application no. PCT/EP2004/010199, which is assigned to Fotonation and corresponding to one or more of seven sequentially numbered U.S. published applications nos. 2005/0068446-452, and no. 2005/0078173, all of which are hereby incorporated by reference, discloses building a statistical dust map based on information derived from one or more images acquired by a camera.

SUMMARY OF THE INVENTION

A digital image acquisition device has an image acquisition sensor, a shutter, optical elements for focusing an image on the sensor, and an aperture disposed between the optical elements and the shutter. The device also includes a light source located in the body of the device and arranged to be periodically activated when the lens cap, shutter or aperture is closed. A map of defects in the sensor and on the surface of the sensor is derived from a calibration image acquired by the sensor when illuminated by the light source.

The device may be arranged to activate the light source in one or a combination of the following events: just before taking an image of a scene; or during inactivity of the device in accordance with a predefined schedule; or just after each turn-ON of the device; or when a lens is replaced; or after each Nth image of a scene is captured, where N is preferably between 3 and 10.

The sensor may include a CCD or a CMOS array. The light source may include one or more LEDs.

The light source may be disposed between the sensor and the shutter. The device may be arranged to activate the light source when the shutter is closed.

The light source may be disposed between the shutter and the aperture. The device may be arranged to activate the light source when the aperture is closed and when the shutter is open.

The device may be arranged to activate the light source when the lens is covered by a lens cap.

The device may be arranged to compare two images captured by the sensor when illuminated by the light source, and responsive to the images differing by greater than a threshold amount, to derive the map of defects.

The device may be arranged to analyze an image captured by the sensor when illuminated by the light source, and responsive to the image including greater than a threshold amount of defects, to derive the map of defects.

The device may be arranged to map the calibration image to the map of defects in association with a device specific look-up table.

The calibration image may be a low resolution or a full resolution image, and may be a full color or grayscale image.

The device may include a body and a removable lens. The optical elements and the aperture may be part of the removable lens and the light source may be located with the body.

The device may be arranged to correct an image of a scene in accordance with the map of defects.

The device may be arranged to inform the user of a need to physically de-dust the device due to excess dust beyond reasonable digital correction. The device may be further arranged to construct a second map of defects of the optical elements, and may be arranged to correct the corrected image in accordance with the second map.

The device may be arranged to store the map of defects with an image of a scene.

The map of defects may include a binary, a gray level or a probabilistic image.

A further digital image acquisition device is provided. The device includes a camera body configured for coupling with a lens assembly. An electronic image sensor is disposed within the camera body. A shutter controls exposure of the sensor by ambient light. A light source is disposed between the sensor and any lenses of the lens assembly for illuminating the sensor. A processor and is programmed by stored instructions to control the light source to illuminate the sensor and to create a sensor defect map based on a calibration image acquired by the sensor when illuminated by the light source.

The device may further comprise the lens assembly coupled with the camera body. The lens assembly may include an aperture and one or more lenses. The processor may be programmed to initiate illumination of the sensor and create the sensor defect map when the aperture is closed. The shutter may be disposed between the light source and the sensor, wherein the shutter would be open when the sensor is illuminated for creating the sensor defect map.

The device may include a lens cap for coupling with the lens assembly thereby preventing exposure of the sensor by ambient light traversing the lens assembly. The processor may be programmed to initiate illumination of the sensor for creating the sensor defect map when the lens cap is coupled to the lens assembly.

The light source may be disposed between the shutter and the sensor, or the shutter may be disposed between the sensor and the light source.

The processor may be programmed to initiate illumination of the sensor for creating the sensor defect map when the shutter is closed and/or just before an image of a scene is acquired by the device and/or on a predetermined schedule during inactivity of the device.

The processor may be programmed to interpret coupling of the lens assembly to the camera body and/or turning-on the device as a trigger for initiating illumination of the sensor for creating the sensor defect map.

The processor may be programmed to automatically update an existing sensor defect map upon creation of a new sensor defect map. Both the existing and new sensor defect maps may be stored for application to images acquired at different times.

The light source may be built into the camera body.

A look up table may be stored in the camera body for providing a mapping from an acquired calibration image to a real sensor defect position map.

A method of correcting acquired digital images for detected sensor defects is also provided. A camera body is configured for coupling with a lens assembly and contains an electronic image sensor, and a light source. The sensor and light source are optically enclosed thereby preventing exposure of the sensor by ambient light. A calibration image acquired by the sensor is detected when illuminated by the light source. A sensor defect map is created based on the calibration image.

Exposure of the sensor by ambient light by enclosing the light source may be controlled by a camera body shutter, a lens aperture, a lens cap, an on/off camera switch, a predetermined schedule, or a lens assembly coupling detection switch, or combinations thereof.

A lens assembly may be coupled to the camera body.

The light source may be disposed between a lens aperture and a camera body shutter, and the shutter may be disposed between the light source and the sensor. The optical enclosing may include closing the aperture, and the illuminating may include opening the shutter.

The light source may be disposed between a camera body shutter and the sensor, and the optical enclosing may include closing the shutter.

An acquired calibration image may be mapped to a real sensor defect position map.

An existing sensor defect map may be automatically updated upon creating a new sensor defect map.

One or more digital storage devices having digital code embodied therein for programming one or more processors to perform a method of correcting acquired digital images for detected sensor defects as recited herein above or below.

BRIEF DESCRIPTION OF THE DRAWINGS

Embodiments of the invention will now be described by way of example with reference to the accompanying drawings, in which.

DETAILED DESCRIPTION OF THE PREFERRED EMBODIMENTS

A digital image acquisition device according to one embodiment is provided with an image acquisition sensor, preferably a CMOS or CCD array (herein generically referred to as CCD), a shutter, an aperture and one or more optical elements for focusing an image on the sensor. The device includes an internal light source, e.g., an LED or LED array, located in the body of the device, preferably between the sensor and the shutter. The device is arranged to activate the light source for a short period of time in accordance with a predefined criteria which can be either just before taking an image of a scene, or at any moment during inactivity of the device (in accordance with a predefined schedule), or just after each turn-ON of the device, or after a change of lens is detected or any combination of the criteria above, and to derive a map of defects on the surface of the sensor from a calibration image acquired by the sensor when illuminated by the light source.

An optical solution is provided for automatically building a dust map in DSLR cameras.

Continuous automatic updating of the dust map is also provided in such cameras to mitigate problems of new dust spots appearing or old dust particles migrating on the CCD surface. In such embodiments, the device is arranged to automatically detect the need to re-calibrate the dust map by comparing different calibration images acquired by the sensor when lit by the light source.

When either a preview or a full resolution image is acquired while the sensor is lit by the light source, the obtained calibration image will be uniform enough to allow construction of a map of dust related defects on the CCD sensor surface. Even if the CCD surface is not uniformly lit (as a consequence of an off-center LED) the non-uniformity is persistent, and can be thus accounted for in a map or a formula that can be stored (in a compressed form) in a lookup table for mapping a calibration image to a final dust map.

In one embodiment, the optical elements are part of a removable lens. By building the light source into a camera body, an advantageous camera can be arranged to receive multiple interchangeable lenses, which is cost effective. This was not considered by Robins in the 2003/0193604 application, which related to a digital camera with an integral lens.

A technique in accordance with an embodiment may be implemented automatically, whereas Robins requires the user to put the lens cover in place before calibration.

A technique in accordance with another embodiment involves the formation of the calibration image directly from the light source, some of which may be obscured by dust or other defects. In Robins, the calibration image is obtained from rays that are reflected by lens contaminants.

A technique in accordance with another embodiment can work with both the aperture and the shutter closed, because in this embodiment, the light source disposed between the sensor and both the aperture and the shutter. In Robins, both the aperture and the shutter must be open to acquire the calibration image, because the aperture and shutter of Robins are located between the light source and sensor.

Another embodiment includes the light source not being focused using the optical system, such that the solution is not dependent on the optical nature of any lenses, and thus computational compensation for various zoom factors or lenses with different focal lengths is obviated.

In alternative embodiments, where the space between the shutter and the CCD sensor is too small, the LEDs can be placed within the camera body between the lens assembly and the shutter. In this case, the shutter is opened, even if not necessarily the aperture, when acquiring the calibration image for the dust map.

In an alternative embodiment, the device may be programmed to activate an LED and capture an image only when the lens cap is on, such that no external light can diffuse the shadows created by the LED light.

Once the calibration image is obtained as described above, a dust detection algorithm can be used to construct a dust map for the lens elements. So, for example, when an image of a scene is acquired, the CCD dust map can be used to correct CCD defects, and then a statistical dust map may be provided in accordance with PCT Application No. PCT/EP2004/010199 or US published application no. 2005/0078173, which are hereby incorporated by reference and assigned to the same assignee as the present application, can be used to correct for image defects caused by dust particles in the optical elements. By contrast, Robins does not disclose a technique for distinguishing between (a) image defects resulting from particles or imperfections on the sensor; and (b) lens element-related defects which ought to be treated differently, especially as the effect of the latter varies more greatly as image acquisition parameters such as focal length and aperture change.

A calibration method in accordance with another embodiment can also be used to detect defects in the sensor also known as "dead-pixels" and "burned pixels".

Figure 2:
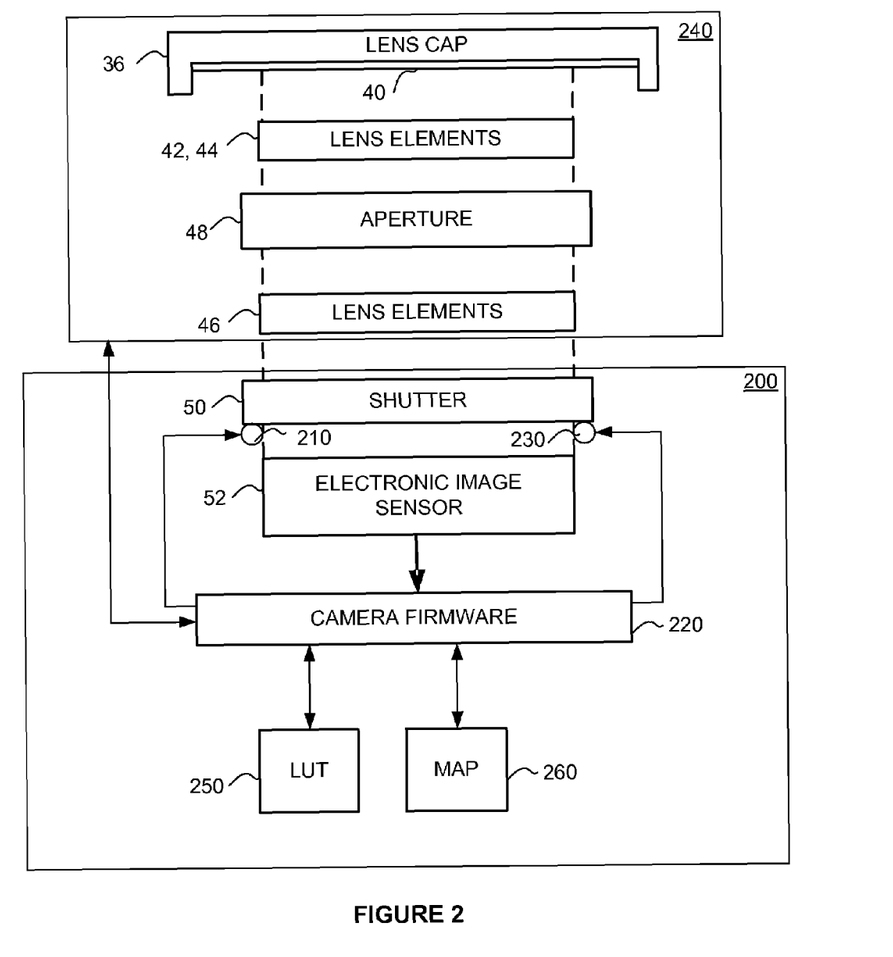
FIG. 2 shows a digital image acquisition device according to certain embodiments.

Referring now to FIG. 2, in a preferred embodiment, a small light source 210 (e.g., a LED) is mounted within a camera body 200 between a CCD sensor 52 and a shutter 50. Illumination of the light source 210, and/or control of other aspects of camera functionality (not shown) is controlled by camera firmware 220 or other program media. In a preferred embodiment, the camera body 200 receives an interchangeable lens 240 including lens elements 42, 44 and 46 and aperture 48, which may have similar in functionality to the corresponding elements of FIG. 1, except that in Robins the lens is integral with the camera body. Again, the camera firmware 220 preferably controls the operation of the lens 240 including setting and reading image acquisition parameters including focal length and aperture as described elsewhere.

In an embodiment, the firmware is arranged to periodically illuminate the light source 210 when the shutter 50 is closed, and to store a calibration image acquired by the sensor. In this embodiment, the source light 210 is not central with respect to the sensor 52. As such, the camera firmware includes a look-up table 250 specific to the camera model to provide a mapping from an acquired calibration image to the real dust position on the CCD sensor. This real dust position information is stored in a map 260. In general, the mapping shifts the calibration image in a direction towards the light source to compensate for non-uniform illumination of the sensor due to the fact that the light source 210 may not be central or uniform with respect to the sensor.

Figure 3:
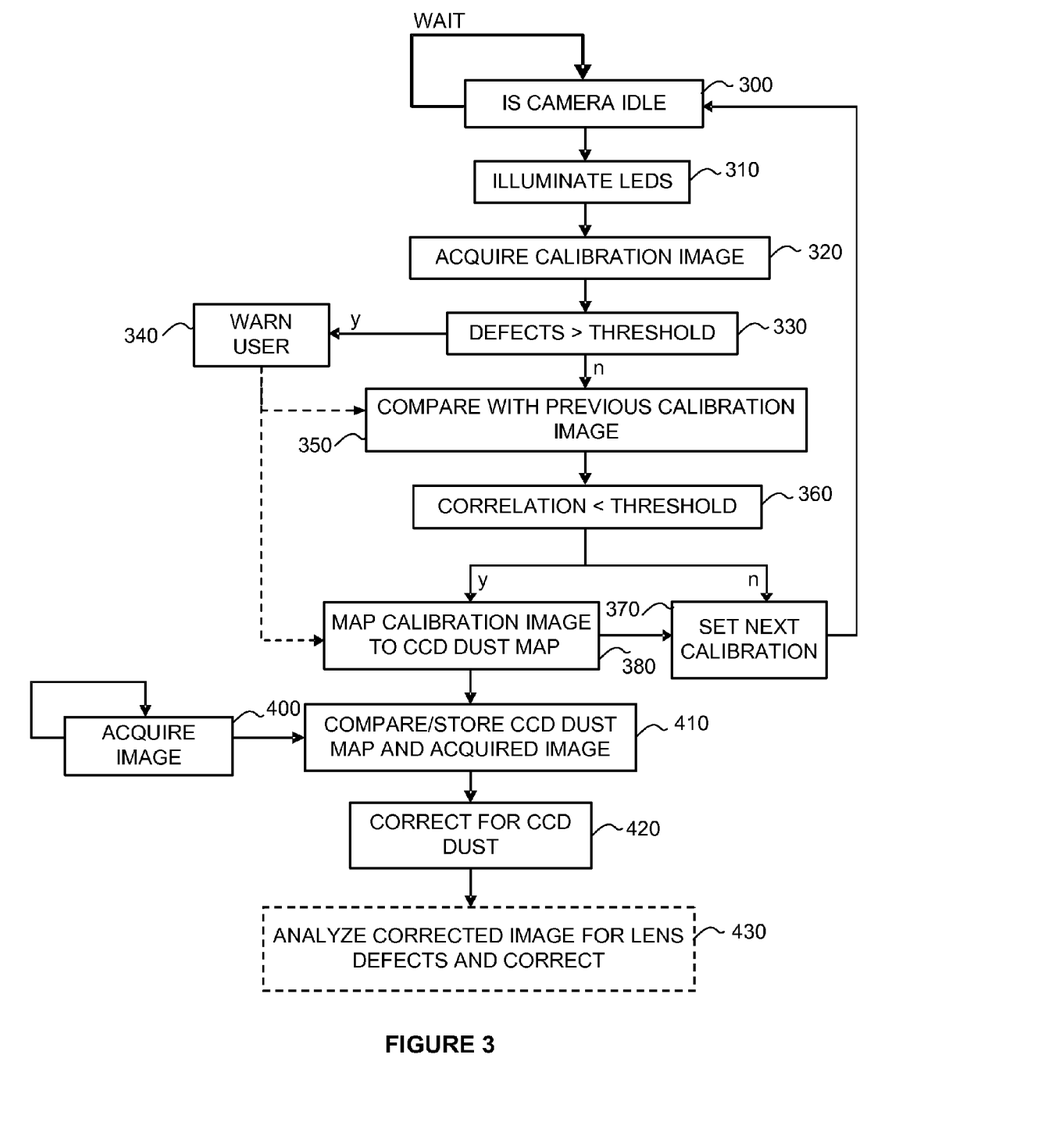
FIG. 3 shows a flow diagram illustrating the operation of the camera firmware.
Figure 4:
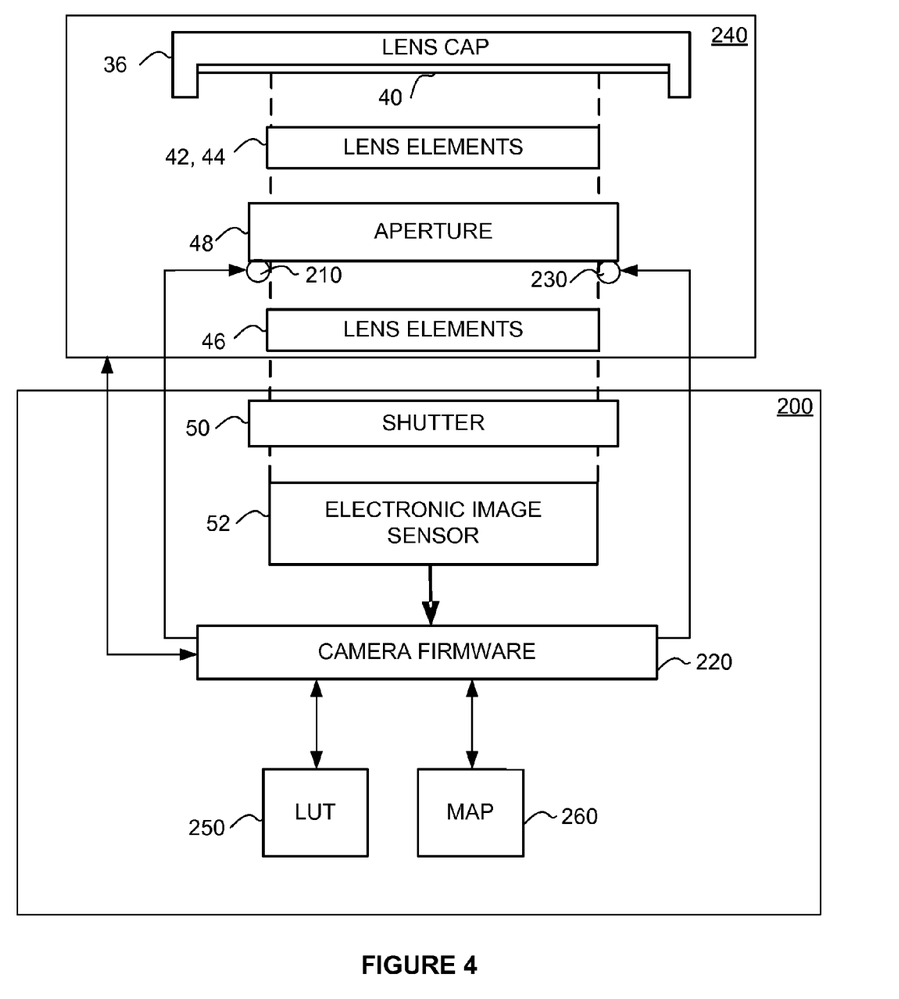
FIG. 4 shows a further digital image acquisition device according to certain embodiments.

An exemplary operation of the firmware 220 is illustrated in FIG. 3. A background or event driven process begins during a camera idle period 300, for example, just before taking an image of a scene, or at any moment during inactivity in accordance with a predefined schedule, or just after each turn-ON, or the process can run every N pictures, say for N between 3 and 10, or a combination of these or other events such as putting on a lens cap or turning the camera off or just after taking an image. In any case, once initiated, the process then causes the source 210 to illuminate the sensor 52 with the shutter closed 310. A calibration image is then acquired 320 and can either be stored in volatile or non-volatile memory for whatever predetermined duration.

The calibration image can first be checked for an aggregate number of defects, and if these exceed a threshold, an alarm can be provided 340 to the user to service the camera body. The threshold can be based on a simple integral or average of image luminance or indeed a count of discrete defects. If an alarm is registered, the process can either continue or terminate.

When the process continues, the calibration image can then be compared 350, 360 with a previous calibration image, if available, to determine if greater than a significant degree of change has occurred. If not 370, the process can terminate before running again at a later time/event.

If a new dust map is desired or it is otherwise determined by the firmware, manually, or due to the occurrence of a specific event or passage of time, to generate a new dust map, then the calibration image is mapped through the look-up table 250 to produce the dust map 260. The mapping from the calibration image to the dust map takes into account the difference in the effect of the light from the source 210 on sensor defects compared to the effect of light through the aperture 48 and shutter 50 on sensor defects when acquiring an image normally.

It will be seen that the calibration image 250 and/or dust map 260 can be processed either as a binary image, with defects either occluding the sensor or not, or as a gray scale or probabilistic type image according to the nature of image correction that may be performed later when processing/correcting normally acquired images using the dust map.

The current dust map 260 can be stored either in volatile or non-volatile memory, for later use in processing acquired images. If storage space is at a premium, the firmware can overwrite the calibration image 250 information with the dust map 260.

In any case, once the dust map has been determined, the camera can acquire images as normal at 400. In a preferred embodiment, the dust map 260 or a pointer to the dust map can be saved with each acquired image 410. For example, for JPG files, the map can be stored in a MakerNote exif tag. A pointer to a dust map is useful where many acquired images may be associated with the same dust map. In such cases, several versions of dust maps may be stored with different acquired images including pointers to different maps.

At any suitable time after an image has been acquired, it can be compared with the dust map 260 to identify and/or correct defects in the image resulting from sensor defects 420. Where camera click-to-click interval is critical, this processing is likely to be performed in the background during periods of camera inactivity. It is also possible that the dust map could be used both to analyze and correct low resolution preview or post-view images as well as full resolution acquired images.

In any case, once an acquired image has been corrected for sensor defects, image processing software or firmware can then continue by using techniques disclosed in, for example, the PCT Application No. PCT/EP2004/010199, incorporated by reference above, to detect and correct at 430 for image defects resulting from dust artifacts in the image acquisition optics. It will be seen that alternative implementations are possible. For example, the light source 210 can emit in any region of the spectrum in which the CCD is sensitive, for example, infrared. Also, many LEDs (230), for example, four, six, eight, etc., may be used to obtain a symmetrical illumination of the CCD, although some calibration may still be required in such cases to take into account the difference in such illumination from light through the aperture 48 and shutter 50. The light source or sources may move, e.g., with the closing of the shutter or with separate mechanics, from being out of the way for the device to take a picture to a position wherein a better calibration image may be taken.

What follows is a cite list of references which are, in addition to that which is described as background, the invention summary, the abstract, the brief description of the drawings and the drawings, and other references cited above, hereby incorporated by reference into the detailed description of the preferred embodiments as disclosing alternative embodiments:

U.S. Pat. No. 6,035,072;

United States published patent applications nos. 2005/0068445, 2005/0068452, 2006/0039690, 2006/0098890, 2006/0098237, and 2006/0098891;

U.S. patent application Ser. Nos. 11/462,035, and 11/282,955; and

U.S. provisional patent application Nos. 60/773,714, and 60/821,956.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention, as set forth in the appended claims and structural and functional equivalents thereof.

In addition, in methods that may be performed according to the claims below and/or preferred embodiments herein, the operations have been described in selected typographical sequences. However, the sequences have been selected and so ordered for typographical convenience and are not intended to imply any particular order for performing the operations, unless a particular ordering is expressly provided or understood by those skilled in the art as being necessary.

The invention claimed is:

1. A digital image acquisition device having an image acquisition sensor, a shutter, one or more optical elements for focusing an image on the sensor, and an aperture disposed between at least one of said one or more optical elements and said shutter, the device including a light source located in a body of the device, and being arranged to periodically activate the light source only when said aperture is closed such that said sensor is substantially unexposed to ambient light, and to derive a map of defects in the sensor or on the surface of the sensor, or both, from a calibration image acquired by the sensor when illuminated by the light source and when said sensor is substantially unexposed to ambient light due to said aperture being closed, and the device is further arranged to correct an acquired image based on the map of defects, and to construct a second defect map based on a second calibration image, and to correct the corrected image in accordance with said second defect map.

2. A digital image acquisition device according to claim 1, wherein the device is arranged to activate the light source in one or a combination of the following events:
   just before taking an image of a scene; or
   during inactivity of the device in accordance with a predefined schedule; or
   just after each turn-ON of the device; or
   when a lens is replaced; or
   after each Nth image of a scene is captured.

3. A digital acquisition device according to claim 2, where N is between 3 and 10.

4. A digital image acquisition device according to claim 1, wherein said sensor comprises one of a CCD or a CMOS array.

5. A digital image acquisition device according to claim 1, wherein said light source comprises one or more LEDs.

6. A digital image acquisition device having an image acquisition sensor, a shutter, one or more optical elements for focusing an image on the sensor, and an aperture disposed between at least one of said one or more optical elements and said shutter, the device including a light source located in a body of the device, and being arranged to periodically activate the light source when one of a lens cap, shutter or said aperture is closed, or a combination thereof, and to derive a map of defects in the sensor or on the surface of the sensor, or both, from a calibration image acquired by the sensor when illuminated by the light source, wherein said light source is disposed between the sensor and both the aperture and the shutter, and wherein the device is arranged to activate the light source when the aperture or shutter, or a combination thereof, is closed, and the device is further arranged to correct an acquired image based on the map of defects, and to construct a second defect map based on a second calibration image, and to correct the corrected image in accordance with said second defect map.

7. A digital image acquisition device according to claim 1, wherein said light source is disposed between the shutter and the aperture, and wherein the device is arranged to activate the light source when the aperture is closed and when the shutter is open.

8. A digital image acquisition device according to claim 1, wherein said device is arranged to activate said light source when the optical elements are covered by the lens cap.

9. A digital image acquisition device according to claim 1, wherein the device is arranged to compare two images captured by the sensor when illuminated by the light source, and responsive to said images differing by greater than a threshold amount, to derive said map of defects.

10. A digital image acquisition device according to claim 1, wherein the device is arranged to analyze an image captured by the sensor when illuminated by the light source, and responsive to said image including greater than a threshold amount of defects, to derive said map of defects.

11. A digital image acquisition device according to claim 1, wherein said device is arranged to map said calibration image to said map of defects in association with a device specific look-up table.

12. A digital image acquisition device according to claim 1, wherein said calibration image comprises a low resolution image or a full resolution image.

13. A digital image acquisition device according to claim 1, wherein said calibration image comprises a full color image or a grayscale image.

14. A digital image acquisition device according to claim 1, further comprising a body that contains said light source and a removable lens that comprises at least one of said one or more optical elements and said aperture.

15. A digital image acquisition device according to claim 1, wherein the device is arranged to correct an image of a scene in accordance with said map of defects.

16. A digital image acquisition device according to claim 15, wherein the device is arranged to inform the user of a need to physically de-dust said device due to excess dust beyond reasonable digital correction.

17. A digital image acquisition device having an image acquisition sensor, a shutter, one or more optical elements for focusing an image on the sensor, and an aperture disposed between at least one of said one or more optical elements and said shutter, the device including a light source located in a body of the device, and being arranged to periodically, at intervals of at least six minutes, activate the light source when one of said shutter or said aperture is closed, or a combination thereof, and to derive a map of defects in the sensor or on the surface of the sensor, or both, from a calibration image acquired by the sensor when illuminated by the light source, wherein the device is arranged to correct an image of a scene in accordance with said map of defects, and the device is further arranged to construct a second map of defects of said optical elements and being arranged to correct said corrected image in accordance with said second map.

18. A digital image acquisition device according to claim 1, wherein the device is arranged to store said map of defects with an image of a scene.

19. A digital image acquisition device according to claim 1, wherein said map of defects comprises a binary, a gray level or a probabilistic image, or combinations thereof.

20. A digital image acquisition device, comprising:
a camera body configured for coupling with a lens assembly including one or more lenses and an aperture;
an electronic image sensor within the camera body;
a shutter for controlling exposure of the sensor by ambient light;
a light source, disposed between the sensor and both said shutter and said aperture, for illuminating the sensor;
a processor; and
one or more digital storage devices having instructions embedded therein for programming the processor to:
control the light source to illuminate the sensor on multiple occasions only when said shutter or said aperture, or a combination thereof, is closed such that said sensor is substantially unexposed to ambient light;
create a sensor defect map based on a calibration image acquired by the sensor when illuminated by the light source and when said sensor is substantially unexposed to ambient light due to said shutter or aperture, or combination thereof, being closed;
correct an acquired image based on the sensor defect map;
construct a second defect map based on a second calibration image; and
correct the corrected image in accordance with said second defect map.

21. The device of claim 20, further comprising said lens assembly coupled with said camera body.

22. The device of claim 20, wherein the processor is programmed to initiate illumination of the sensor and creation of the sensor defect map when the aperture is closed.

23. The device of claim 22, wherein the shutter is disposed between the light source and the sensor, and the shutter is open when the sensor is illuminated for creating the sensor defect map.

24. The device of claim 21, further comprising a lens cap for coupling with the lens assembly thereby preventing exposure of the sensor by ambient light traversing the lens assembly.

25. The device of claim 24, wherein the processor is programmed to initiate illumination of the sensor for creating the sensor defect map when the lens cap is coupled to the lens assembly.

26. A digital image acquisition device, comprising:
a camera body configured for coupling with a lens assembly including one or more lenses and an aperture;
an electronic image sensor within the camera body;
a shutter for controlling exposure of the sensor by ambient light;
a light source, disposed between the sensor and the one or more lenses of the lens assembly, as well as between the sensor and both the shutter and the aperture, the light source for illuminating the sensor on multiple occasions when a lens cap is on, or the shutter or the aperture is closed, or combinations thereof;
a processor; and
one or more digital storage devices having instructions embedded therein for programming the processor to:
control the light source to illuminate the sensor;
create a sensor defect map based on a calibration image acquired by the sensor when illuminated by the light source;
correct an acquired image based on the sensor defect map;
construct a second defect map based on a second calibration image; and
correct the corrected image in accordance with said second defect map.

27. The device of claim 26, wherein the processor is programmed to initiate illumination of the sensor for creating the sensor defect map when the shutter is closed.

28. The device of claim 27, wherein the processor is programmed to interpret coupling of the lens assembly to the camera body acts as a trigger for said initiating illumination of the sensor for creating the sensor defect map.

29. The device of claim 27, wherein the processor is programmed to initiate said illumination of the sensor for creating the sensor defect map just before an image of a scene is acquired by the device.

30. The device of claim 27, wherein the processor is programmed to initiate said illumination of the sensor for creating the sensor defect map on a predetermined schedule during inactivity of the device.

31. The device of claim 27, wherein the processor is programmed to interpret turning-on the device as a trigger for initiating illumination of the sensor for creating the sensor defect map.

32. The device of claim 20, wherein the processor is programmed to automatically update an existing sensor defect map upon creation of a new sensor defect map.

33. The device of claim 32, wherein the both the existing and new sensor defect maps are stored for application to images acquired at different times.

34. The device of claim 20, wherein the light source is built into the camera body.

35. The device of claim 20, further comprising a look up table stored therein for to provide a mapping from an acquired calibration image to a real sensor defect position map.

36. A method of correcting acquired digital images for detected sensor defects, comprising:
providing a camera body that is configured for coupling with a lens assembly and that contains an electronic image sensor, and a light source;
optically enclosing the sensor and light source thereby preventing exposure of the sensor by ambient light, including closing an aperture of the lens assembly;
only while said sensor and light source are optically enclosed due to said closing of said aperture, illuminating the sensor with the light source on multiple occasions;
detecting a calibration image acquired by the sensor when illuminated by the light source on a first occasion; and
creating a sensor defect map based on the calibration image,
generating a corrected image based on an acquired image and the sensor defect map;
constructing a second defect map based on a further calibration image acquired by the sensor on a second occasion; and
correcting the corrected image in accordance with said second defect map.

37. The method of claim 36, wherein preventing exposure of the sensor by ambient light by enclosing the light source is controlled by a camera body shutter, a lens aperture, a lens cap, an on/off camera switch, a predetermined schedule, or a lens assembly coupling detection switch, or combinations thereof.

38. The method of claim 36, further comprising coupling the lens assembly to the camera body.

39. The method of claim 36, wherein the light source is disposed between a lens aperture and a camera body shutter, and the shutter is disposed between the light source and the sensor, and wherein the optical enclosing comprises closing the aperture, and the illuminating further comprises opening the shutter.

40. A method of correcting acquired digital images for detected sensor defects, comprising:
providing a camera body that is configured for coupling with a lens assembly and that contains an electronic image sensor, and a light source;
optically enclosing the sensor and light source thereby preventing exposure of the sensor by ambient light, wherein the light source is disposed between both a camera body shutter and aperture of the lens assembly, and the sensor, and wherein the optical enclosing comprises closing the shutter;
illuminating the sensor with the light source on multiple occasions;
detecting a calibration image acquired by the sensor when illuminated by the light source;
creating a sensor defect map based on the calibration image; and
generating a corrected image based on an acquired image and the sensor defect map;
constructing a second defect map based on a further calibration image acquired by the sensor on a second occasion; and
correcting the corrected image in accordance with said second defect map.

41. The method of claim 36, further comprising mapping an acquired calibration image to a real sensor defect position map.

42. The method of claim 36, further comprising automatically updating an existing sensor defect map upon creating a new sensor defect map.

43. One or more digital storage devices having digital code embodied therein for programming one or more processors to perform a method of correcting acquired digital images for detected sensor defects, the method comprising:
initiating an optical enclosure of an image sensor and a light source thereby preventing exposure of the sensor by ambient light, including closing an aperture;
during said optical enclosure of said image sensor due to said closing of said aperture, illuminating the sensor with the light source on multiple occasions;
detecting a calibration image acquired by the sensor when illuminated by the light source; and
creating a sensor defect map based on the calibration image; and
generating a corrected image based on an acquired image and the sensor defect map;
constructing a second defect map based on a further calibration image acquired by the sensor on a second occasion; and
correcting the corrrected image in accordance with said second defect map.

44. The one or more storage devices of claim 43, wherein preventing exposure of the sensor by ambient light by enclosing the, light source is controlled by a camera body shutter, a lens aperture, a lens cap, an on/off camera switch, a predetermined schedule, or a lens assembly coupling detection switch, or combinations thereof.

45. The one or more storage devices of claim 43, the method further comprising coupling the lens assembly to the camera body.

46. The one or more storage devices of claim 43, wherein the light source is disposed between a lens aperture and a camera body shutter, and the shutter is disposed between the light source and the sensor, and wherein the optical enclosing comprises closing the aperture, and the illuminating further comprises opening the shutter.

47. One or more digital storage devices having digital code embodied therein for programming one or more processors to perform a method of correcting acquired digital images for detected sensor defects, the method comprising:
initiating an optical enclosure of an image sensor and a light source thereby preventing exposure of the sensor by ambient light, wherein the light source is disposed between a camera body shutter and the sensor, and wherein the optical enclosing comprises closing the shutter;
illuminating the sensor with the light source periodically at equal intervals of at least one day;
detecting a calibration image acquired by the sensor when illuminated by the light source; and
creating a sensor defect map based on the calibration image; and
generating a corrected image based on an acquired image and the sensor defect map;
constructing a second defect map based on a further calibration image acquired by the sensor on a second occasion; and
correcting the corrected image in accordance with said second defect map.

48. The one or more storage devices of claim 43, the method further comprising mapping an acquired calibration image to a real sensor defect position map.

49. The one or more storage devices of claim 43, the method further comprising automatically updating an existing sensor defect map upon creating a new sensor defect map.

50. The device of claim 17, wherein said intervals comprise at least one day.

51. The device of claim 17, wherein said intervals comprise at least four days.

52. The device of claim 17, wherein said intervals comprise at least one month.

53. The device of claim 17, wherein said intervals comprise at least one hour.

\* \* \* \* \*